(12) United States Patent
Putney et al.

(10) Patent No.: US 7,311,022 B2
(45) Date of Patent: Dec. 25, 2007

(54) RETENTION SOCKET

(75) Inventors: Gordon A. Putney, Lake Geneva, WI (US); Marco E. DeVecchis, Racine, WI (US); Scott G. Dahlke, Milwaukee, WI (US)

(73) Assignee: Snap-on Incorporated, Kenosha, WI (US)

( * ) Notice: Subject to any disclaimer, the term of this patent is extended or adjusted under 35 U.S.C. 154(b) by 151 days.

(21) Appl. No.: 10/919,050

(22) Filed: Aug. 16, 2004

(65) Prior Publication Data

US 2006/0032343 A1 Feb. 16, 2006

(51) Int. Cl.
*B25B 13/06* (2006.01)

(52) U.S. Cl. ............... 81/125; 81/121.1; 81/124.3

(58) Field of Classification Search ............. 81/125, 81/186, 119, 121.1, 124.4, 124.3, 124.7; D8/29
See application file for complete search history.

(56) References Cited

U.S. PATENT DOCUMENTS

| | | | |
|---|---|---|---|
| 838,109 A * | 12/1906 | Hanes et al. ............... 81/124.4 |
| 1,590,200 A | 6/1926 | McGuckin |
| 3,273,430 A | 9/1966 | Knudsen et al. |
| 3,481,243 A | 12/1969 | Gatz |
| 3,584,667 A | 6/1971 | Reiland |
| 4,126,063 A | 11/1978 | Palmer |
| 4,765,211 A | 8/1988 | Colvin |
| 4,947,712 A | 8/1990 | Brosnan |
| 4,970,922 A | 11/1990 | Krivec |
| 5,012,706 A | 5/1991 | Wright et al. |
| 5,219,253 A * | 6/1993 | Shinjo ................. 411/403 |
| 5,277,531 A | 1/1994 | Krivec |
| 5,284,073 A | 2/1994 | Wright et al. |
| 5,361,657 A | 11/1994 | Terry et al. |
| D353,756 S * | 12/1994 | Graves ................. D8/29 |
| 5,388,486 A | 2/1995 | Ruzicka et al. |
| 5,476,024 A | 12/1995 | Hsieh et al. |
| 5,553,983 A | 9/1996 | Shinjo |
| 5,782,148 A * | 7/1998 | Kerkhoven ............. 81/124.6 |
| 5,832,792 A * | 11/1998 | Hsieh .................... 81/124.6 |
| 5,904,076 A | 5/1999 | Siwy et al. |
| 6,003,411 A | 12/1999 | Knox et al. |
| 6,098,501 A * | 8/2000 | Sundstrom ............. 81/121.1 |
| 6,131,492 A | 10/2000 | Mai |
| 6,223,634 B1 | 5/2001 | Hughes et al. |
| 6,269,716 B1 | 8/2001 | Amis |
| 6,389,934 B1 | 5/2002 | Yen |
| 6,598,498 B1 | 7/2003 | Pigford et al. |
| 6,626,067 B1 * | 9/2003 | Iwinski et al. ......... 81/121.1 |
| 2001/0054334 A1 | 12/2001 | Ling et al. |
| 2004/0020332 A1 | 2/2004 | Hsieh |
| 2004/0255728 A1 * | 12/2004 | Hsieh .................... 81/186 |

FOREIGN PATENT DOCUMENTS

DE 20 2004 007 232 U1 7/2004

* cited by examiner

*Primary Examiner*—Hadi Shakeri
(74) *Attorney, Agent, or Firm*—Seyfarth Shaw LLP (57) ABSTRACT

A tool for torquing threaded fasteners includes a socket body having formed therein a fastener-receiving receptacle with an axis of rotation, the receptacle having a plurality of interior faces arranged in a generally polygonal configuration and substantially parallel to the axis, with each of the interior faces having projecting laterally inwardly therefrom a pair of fastener-engaging surfaces with inner and outer ends spaced apart in use substantially axially, each fastener-engaging surface being arcuate and sloping away from the axis from a closed end toward an open end of the socket.

16 Claims, 4 Drawing Sheets

RETENTION SOCKET

BACKGROUND

The present application relates to tools for turning threaded fasteners, such as bolts, nuts, spark plugs and the like and, in particular, relates to a retention socket for retaining and torquing threaded fasteners.

It is known to provide socket-type salvage tools with laterally inwardly projecting teeth or barbs designed to dig into a fastener surface to facilitate turning of the fastener. Such an arrangement is disclosed, for example, in U.S. Pat. No. 4,947,712. While that arrangement works relatively well for rotating the fastener, it tends to destroy the fastener, can be used for rotation in only one direction, and tends to have a relatively short life because the teeth or barbs tend to become worn or broken in use. Also, such arrangements that have a single projecting segment may permit axial tipping of the fastener.

It is also known to provide fastener turning tools which have corner relief regions and drive surfaces, which may be arcuate, that are designed to engage the fastener away from the corner, to assist in turning fasteners with worn or rounded corners. However, these arrangements do not assist in manipulating or rotating fasteners that are in hard to access spaces. For example, when applying or removing fasteners or spark plugs from an engine, it is important that the tool retain the fastener within the socket when the fastener or spark plug is dislocated from the work area of the engine so that the fastener does not fall into the engine when the tool is pulled away or directed toward the work area. Such previously known tools for removing spark plugs use features such as magnets, a rubber boot or wire clip in order to retain the spark plug within the socket. Such features add additional components to the tool, increasing costs and manufacturing steps. For example, many additional machining steps may be required to add such features to a tool. As well, such previous arrangements are difficult to incorporate into a socket designed for engaging the sides of a polygonal fastener in order to retain the fastener within the socket. Therefore, a retention socket that has less components, is less complicated to assemble and is less expensive is desirable.

SUMMARY

The present tool provides for a retention socket for torquing and retaining a fastener, the socket comprising a body having a plurality of interior faces disposed about a receptacle for receiving sides of the fastener disposed within the socket for torquing, at least one interior face having at least two retention ridges so that at least one of the fastener sides is engaged by the pair of retention ridges. In an embodiment, one of the retention ridges is skewed with respect to the other retention ridge. In an embodiment, the retention ridges are defined by a depression formed in the interior face, with each edge of the depression providing a retention ridge. In an embodiment, the depression may be a concave, paraboloid-shaped area. In an embodiment, the socket may include an open end and a closed end and a gap separating the retention ridges being wider adjacent the open end than adjacent the closed end. In an embodiment, the receptacle may include an axis of rotation and each retention ridge may be tapered away from the axis of rotation from the closed end toward the open end.

In an embodiment, the interior faces may be generally convex as viewed from an axis of rotation of the receptacle except for the depression formed therein. In an embodiment, the ridges meet at an apex adjacent the closed end. In an embodiment, the number of the interior faces is greater than two and the faces cooperate to define a closed configuration. In an embodiment, the interior faces alternate intermediate areas for circumscribing the receptacle. In an embodiment, the interior faces may be six in number and may cooperate to define a generally hexagonal configuration. In an embodiment, the receptacle may further include an inner end surface substantially perpendicular to the axis of rotation and intersecting each of the interior faces at its inner end, the inner end surface having an opening therein centrally thereof.

In an embodiment, the retention ridges may be sloped at an inclined angle of approximately 1.5 to 7 degrees with respect to the axis of rotation. In an embodiment, the interior faces may include opposed faces on opposite sides of the receptacle for respectively engaging opposite sides of the fastener received within the receptacle. In an embodiment, each retention ridge may have a variable slope.

In a further embodiment, a method of forming a retention socket is provided, comprising the steps of forming a receptacle within a socket, forming a plurality of interior faces, each face having a generally convex shape, and forming in each of the interior faces a generally concave depression, so that two retention surfaces are formed at edges of the depression. In an embodiment, the method may further comprise the steps of forming the depression having generally paraboloid shapes, forming the receptacle having an open end, a closed end and an axis of rotation and forming retention surfaces that taper away from the axis of rotation from the closed end toward the open end. In an embodiment, the method further comprises the step of machining the interior faces to form the depressions.

In an embodiment, the method may further comprise the step of forming the depression generally in the shape of a paraboloid. In an embodiment, the method may further comprise the step of machining the interior faces simultaneously with one tool. In an embodiment, the method may further comprise the step of forming the interior faces generally in a tent shape so that a ridge is formed along the center of the interior face, the ridge disposed between a first edge and second edge of the interior face and the ridge elevated above a plane extending between the first and second edge.

Another embodiment provides for a method of driving a fastener comprising the steps of inserting a fastener within a receptacle of a socket, the receptacle having an axis of rotation and interior faces, at least two interior faces each having at least two retention ridges and the fastener having at least two flat sides, aligning the flat sides of the fastener respectively with the at least two interior faces, engaging each pair of retention ridges against the aligned flat sides of the fastener, retaining the fastener within the receptacle and rotating the socket in order to apply torque to either loosen or tighten the fastener.

In an embodiment, the fastener may have a hexagonal shape and the socket may have six corresponding interior faces. In an embodiment, twelve (12) retention ridges may be provided by the socket. In an embodiment, the receptacle may include at least a first pair of retention ridges and, opposite the first pair, a second pair of retention ridges and the method further comprising the steps of forming the pairs of retention ridges that taper inward toward the axis so that the fastener is wedged between at least the first and second pair of retention ridges, and inserting the fastener within the receptacle so that the faster receives a friction fit within the receptacle. In an embodiment, at least two flat sides may be opposed to each other on the fastener.

An additional embodiment provides for a tool comprising a socket having a receptacle with an axis of rotation, the receptacle having an open end and a closed end, an interior surface formed within the receptacle, a first retention ridge formed in the interior surface and the first retention ridge having a first end adjacent the open end and a second end adjacent the closed end and the ridge formed as an arcuate linear edge wherein the first end is spaced radially further from the axis than the second end. In an embodiment, the interior surface has a generally rectangular outline and includes a center plane subdividing the rectangle in half and the second end of the first retention ridge is oriented approximately at the center plane and a depression is formed in the interior surface so that the central axis lies in the center plane. In an embodiment, the first retention ridge is generally concave with respect to the center plane.

In an embodiment, a second retention ridge may be formed in the interior surface as a mirror image to the first retention ridge, the second retention ridge having a first end and a second end and the first retention ridge second end overlying the second retention ridge second end to form an apex at the center plane and the first and second retention ridges form a generally paraboloid shape wherein the apex is spaced radially closer to the axis than the first ends of each of the ridges. In an embodiment, the interior surface may be generally convex in shape as viewed from the axis and a depression is formed therein to form the first and second retention ridges. In an embodiment, the depression is generally paraboloid in shape.

In another embodiment a tool is provided comprising a plurality of faces disposed about a body having a central axis, each face having defined thereon and confined thereto a first surface formed parallel to the axis and a second surface being non-planar and intersecting the first surface to form a ridge and the ridge for engaging a fastener received within the receptacle and for torquing the fastener. In an embodiment, the first surface may be adjacent an intermediate area and having a first edge therebetween and the first surface lying in a plane formed between the ridge and the first edge. In an embodiment, the second surface may be concave. In an embodiment, the second surface may be a generally parabolic shaped depression formed in the first surface. In an embodiment, the ridge may form an arcuate edge that is tapered with respect to the central axis. In an embodiment, the tool may further comprise a third surface that may be non-planar and intersecting the first surface to form a second ridge wherein a pair of ridges are provided on each interior face for engaging a fastener side. In an embodiment, the face is an interior face of a socket. In an embodiment, the face is an outer face of a male tool.

BRIEF DESCRIPTION OF THE DRAWINGS

For the purpose of facilitating an understanding of the tool, there is illustrated in the accompanying drawings an embodiment thereof, from an inspection of which, when considered in connection with the following description, the tool, its construction and operation, and many of its advantages should be readily understood and appreciated.

DETAILED DESCRIPTION

Referring now to FIGS. 1-5b, there is illustrated an embodiment of a tool, in the form of a body or socket 10. The socket 10 includes a generally cylindrical outer wall 15 forming a generally cylindrical receptacle 20. The socket 10 has an open end 21 and a closed end 22. In an embodiment, the closed end 22 may be cylindrical. The socket 10 may be used with a ratchet wrench and may include a square drive hole (not shown) at the closed end 22. The open end 21 has a plurality of interior faces 25. In an embodiment, the receptacle 20 is generally polygonal in shape, such as a generally hex shaped configuration (e.g. for receiving a male hex fastener) and may include six interior faces or drive regions 25 equiangularly spaced around the interior of the open end 21 of the receptacle 20. The generally polygonal shape of the receptacle may be provided whether the actual interior faces 25 are planar or non-planar.

In an embodiment, each interior face 25 includes a set of retention ridges 31, 32. In an embodiment, each retention ridge 31, 32 forms an edge of a depression 35 formed in the interior face 25. Therefore, as shown in the FIGS. 1 and 2, six depressions 35 are provided respectively in the six interior faces 25, forming a total of twelve retention ridges 31, 32. In the embodiment depicted in FIG. 4, it can be seen that both retention ridges 31, 32 engage a side 55 of an associated fastener 50. In an embodiment, the retention ridges 31, 32 may have the same profile and, therefore, provide equal retention and rotational force for clockwise or counterclockwise torquing of a fastener 50. However, it may be understood that other socket 10 embodiments may be provided which have as few as three interior faces 25 and as many as hundreds of interior faces 25, each having at least twice as many retention ridges 31, 32. Other embodiments may provide for more than two retention ridges formed on each interior face 25. Adjacent each interior face 25 are intermediate areas or corner relief regions 37. In an embodiment, the intermediate areas 37 are arcuate shaped in transverse cross-section and receive the corners of a polygonal fastener 50 received within the receptacle 20. Deep corner regions may be provided to prevent the corners of the fastener from contacting the corner regions of the intermediate areas 37. In an embodiment, the interior faces 25 and intermediate areas 37 alternate to define a closed configuration of the socket 10.

Figure 5A:
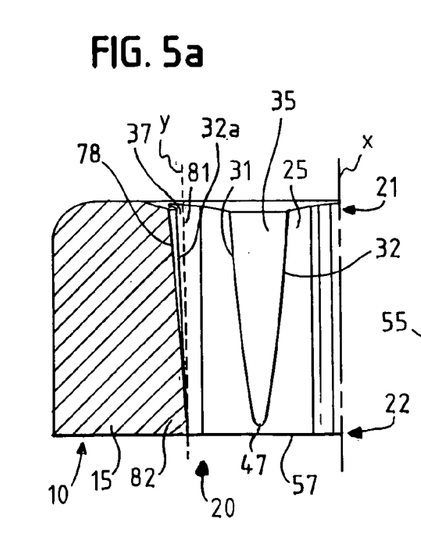
FIG. 5a is an enlarged view of a portion of the socket of FIG. 3.
Figure 5B:
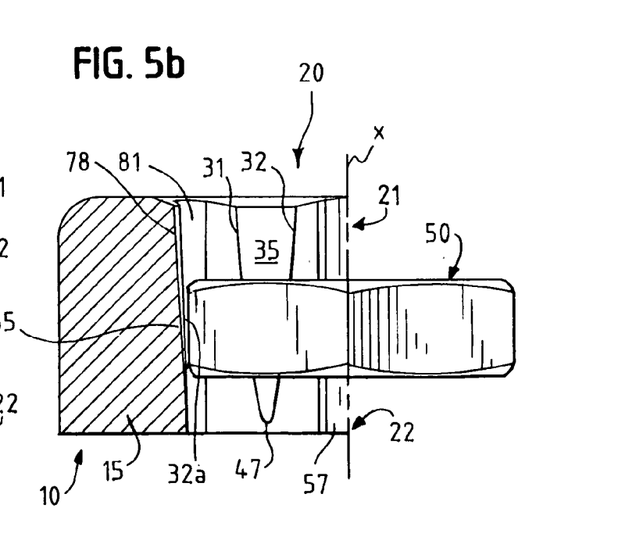
FIG. 5b is the enlarged view of FIG. 5a depicted with a fastener applied therein.

In an embodiment, the depressions 35 are formed to provide a paraboloid shaped area including an apex 47 formed where the ridges 31, 32 converge. The depression 35 is convex and is generally paraboloid shaped. The receptacle 20 includes an axis of rotation X and a parallel axis Y (FIG. 5b). In an embodiment, each retention ridge 31, 32 (including ridges 31a, 32a, 31b, 32b depicted in FIGS. 2, 3 and 5a, b) is tapered or sloped away from the axis of rotation X and axis Y (parallel to axis X) from adjacent to the closed end 22 toward the open end 21. The retention ridges 31, 32 are separated by a gap, such as a depression 35, that is wider adjacent to the open end 21 than adjacent to the closed end 22 of the receptacle 20. Thus, as shown in FIG. 5*b*, when a fastener 50 is received within the receptacle 20, the fastener sides 55 engage the retention ridges 31, 32, 32*a* so that, as the fastener 50 is moved from the open end 21 towards the closed end 22, the retention ridges 31, 32, 32*a* engage the sides 55 with greater frictional force and the fastener 50 becomes press-fit or wedged therebetween. Thus, it may be understood that the tapered retention ridges 31, 32, 32*a* will bite or engage the sides 55 of the fastener 50 in order to retain the fastener 50 within the receptacle 20. The force applied against the sides 55 of the fastener 50 is equal to or greater than the weight of the fastener 50 so that the socket 10 may be swung around without allowing the fastener 50 to be ejected by the force of gravity or by small centrifugal forces.

The retention ridges 31, 32, 32*a* will also minimize axial movement or tipping of the fastener 50, allow the fastener 50 to maintain an axially centered position during torquing and provide for better holding force on the fastener 50. The socket 10 includes a shoulder 57 that is formed between the closed end 22 and the open end 21 of the receptacle 20. In an embodiment, the fastener 50 may be threaded on a nut or screw having threads. As shown in FIG. 5*b*, the fastener 50 is disposed within the receptacle 20 so that a side 55 is engaged by a retention ridge 32*a*. The ridge 32*a* is formed in an interior face 25*a* formed on an opposite side of the receptacle 20 from the interior face 25*b* including ridge 32*b* (see FIGS. 2 and 3).

Figure 6:
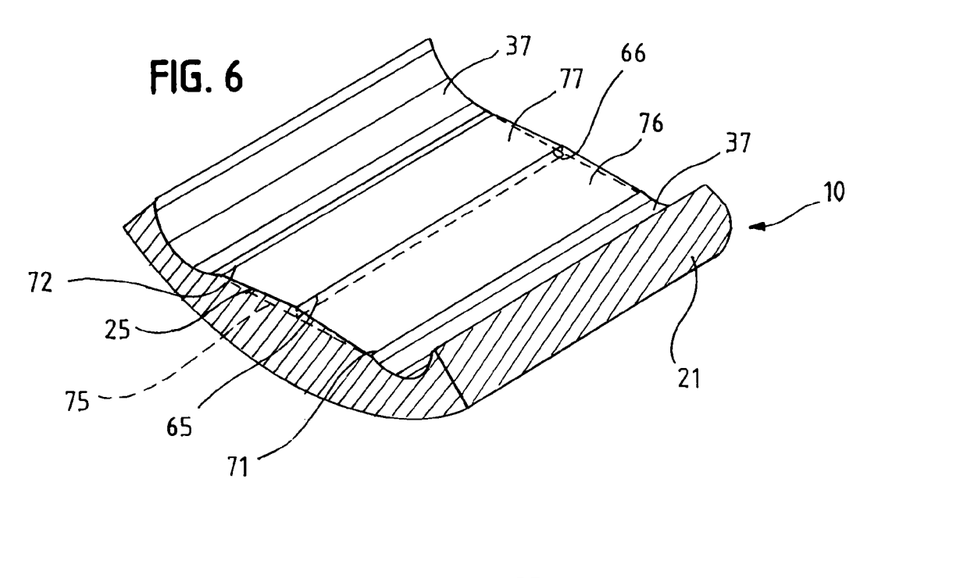
FIG. 6 is a fragmentary, perspective view of a segment of a socket prior to machining of retention ridges.

Turning to FIG. 6, a method of manufacturing the socket 10 will be described. FIG. 6 depicts a segment of the open end 21 of the socket 10 showing a single interior face 25 formed between a pair of intermediate areas 37. In an embodiment, the interior face 25 is formed generally in a tent shape, so that a crest 65 is disposed between a first edge 71 and a second edge 72, each edge provided at the periphery of the interior face 25. A base plane 75 lies between the first and second edges 71, 72. The crest 65 is elevated above the base plane 75. A center plane 66 is formed perpendicular to the base plane 75 and includes the crest 65. Each interior face 25 has inclined surfaces 76, 77 formed on opposite sides of the crest 65. A cross section of each side of the interior face 25 at the inclined surface 76, 77, forms a right angled triangle as depicted in FIG. 6. These inclined surfaces 76, 77 form a low aspect ratio, common constant axial tent section. Alternate shapes of the entire interior face 25 may be provided, such as convex, stepped, arcuate, etc.

Figure 7:
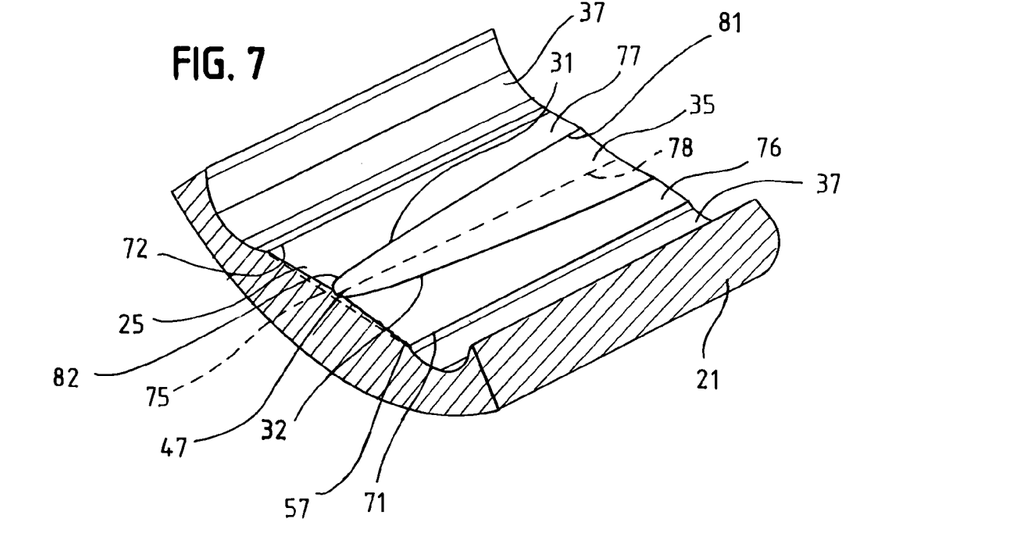
FIG. 7 is a view similar to FIG. 6 of the socket after machining of retention ridges.

Turning to FIG. 7, the manufacturing process in an embodiment, next provides for the step of machining a depression 35 in the inclined surfaces 76, 77 in a generally paraloboid shape. In an embodiment, a secondary drill, mill or ream machining of the socket 10 occurs in order to provide the depression 35. Such machining may occur by processing each interior face 25 individually or all of the interior faces 25 of the socket 10 simultaneously with a single tool inserted within the receptacle 20. Other shaped depressions 35 may be provided such as a generally conical shape, etc. Other methods such as cold forming or wire EDM may be used to provide the surfaces of the receptacle 20.

Figure 4:
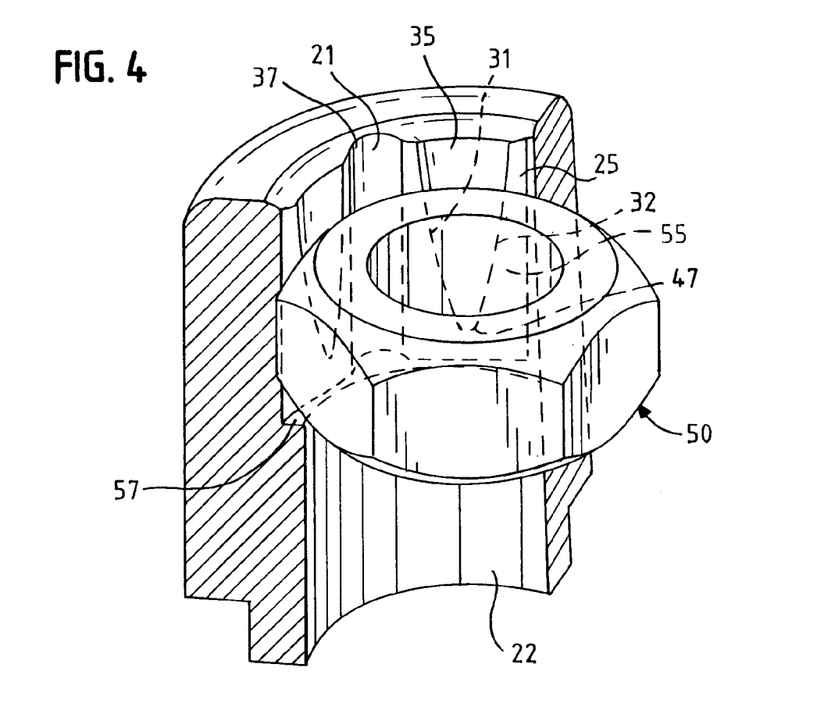
FIG. 4 is a fragmentary, perspective view of the socket of FIG. 3 shown applied to an associated fastener.

Such a machining of the depression 35 therein forms the retention ridges 31, 32 in each interior face 25. Each ridge 31, 32 includes a first end 81 and a second end 82. In an embodiment, each ridge 31, 32 forms an arcuate linear edge formed between the first end 81 and the second end 82. In an embodiment, the apex 47 of the depression 35 is formed at the crest 65 and the second ends 82 of the retention ridges 31, 32 are adjacent the apex 47. In an embodiment, the apex 47 abuts the shoulder 57, as shown in FIG. 7. In an alternate embodiment, the apex 47 may lie adjacent and be spaced from the shoulder 57, as shown in FIG. 4. In an embodiment, the crest 65 is disposed in the center plane 66 subdividing the interior face 25 into the inclined surfaces 76, 77. The apex 47 of the depression 35 and its central axis may be formed generally at the center plane 66. The depression 35 has a bottom 78 that is formed at the center plane 66. In an embodiment, each retention ridge 31, 32 may be generally concave as viewed from the center plane 66.

In an embodiment, each retention ridge 31, 32 is a mirror image of the opposite retention ridge of the pair formed in each interior face 25. Such a pair of retention ridges 31, 32 has each first end 81 spaced radially farther from the axis of rotation X than the second end 82, which is closer to the axis X, so that each retention ridge 31, 32 is tapered. The second end 82 of each retention ridge 31, 32 may be elevated at the same height to provide a uniform retention force on each side 55 of the fastener 50. As the ridges 31, 32 are mirror images they are skewed with respect to one another. For example, a gap is formed between the ridges 31, 32 and the gap is wider adjacent the open end 21 than adjacent the closed end 22. As well, each arcuate ridge 31, 32 crosses the other ridge at the apex 47. The skewed or non-parallel orientation of the ridges 31, 32, which may be off-set in a single plane or multiple planes, provides for enhanced frictional engagement of the sides 55 of a fastener 50 and reduced axial tipping.

In an alternate embodiment, the first retention ridge 31 may be elevated at particular points along its arcuate edge greater than corresponding points of the second retention ridge 32. In other words, the second retention ridge 32 or side of the depression 35 may be bowed more or have a greater arc than the first retention ridge 31 (or opposite side of the depression 35). The greater arc will cause the second retention ridge 32 to have points along its length that lie closer to the base plane 75 than corresponding points on the first retention ridge 31, having a more shallow arc. Such an embodiment, having non-uniform sets of retention ridges 31, 32, may provide for enhanced torquing or retention in a clockwise direction vs. a counterclockwise direction, it being understood that the first retention ridge 32 may have a shallow arc and the second retention ridge 32 a deep arc in order to reverse the torquing effect. Also, both retention ridge 31, 32 tapers may be adjusted jointly or separately in order to accommodate various types and sizes of fasteners. For example, when manufacturing the socket, the distance between the retention ridges 31 and 32 may be adjusted in order to provide the desired elevation or taper to accommodate various fasteners.

Figure 1:
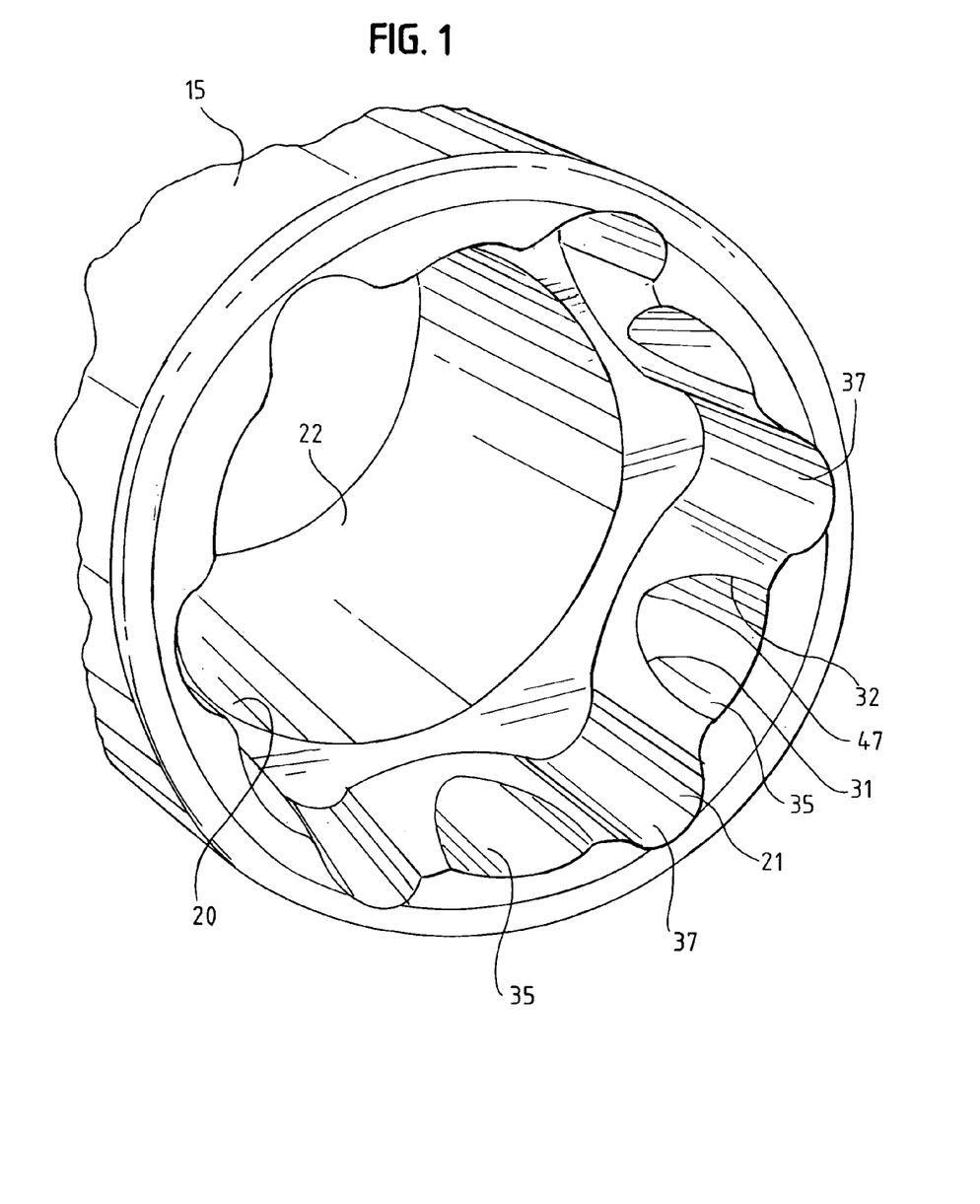
FIG. 1 is a perspective view of the interior of a socket in accordance with an embodiment of the present application.
Figure 2:
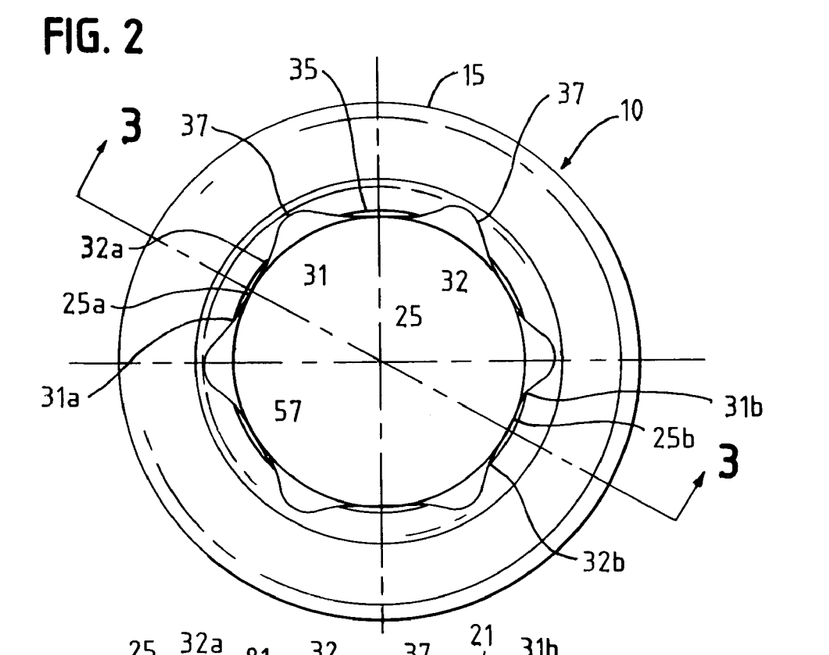
FIG. 2 is a top plan view of the socket of FIG. 1.
Figure 3:
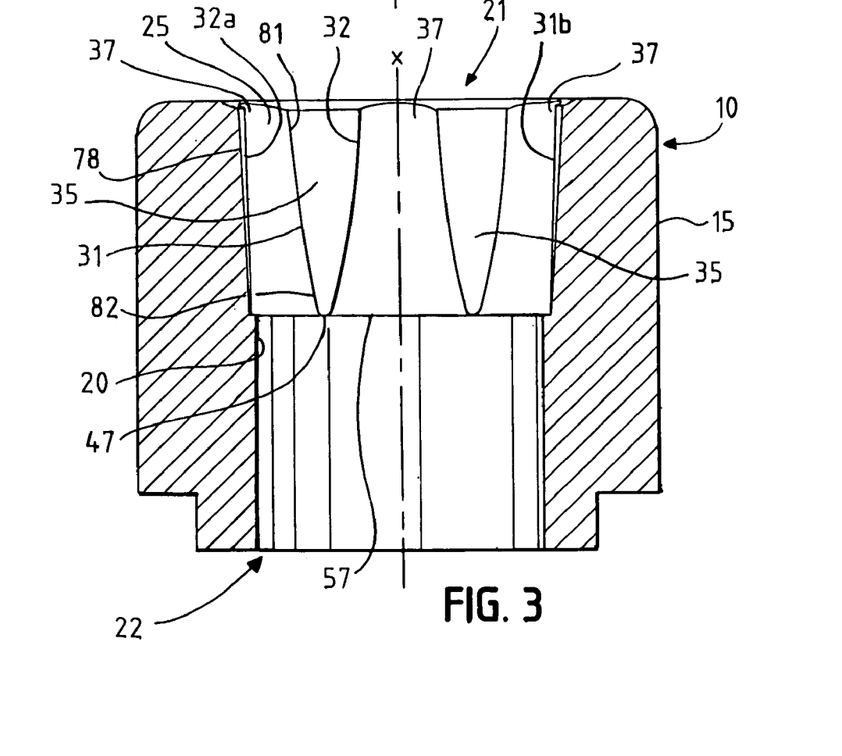
FIG. 3 is a sectional view of the socket of FIG. 2 taken at line 3-3.

In an embodiment, the slope of the retention ridges 31, 32 may vary within a range of angles. Fundamentally, the slope must be such that the distance between opposite pairs of retention ridges (for example, 32*a* and 31*b* as shown in FIG. 3) adjacent the closed end 22 is less than the diameter of the fastener 50 and must be such as to ensure that the sides 55 of the fastener 50 will engage the retention ridges 31, 32 adjacent the open end 21 before the fastener 50 bottoms against the closed end 22 or shoulder 57 of the receptacle 20. It will be appreciated that this depends upon the initial clearance between the fastener 50 at the open end 21 of the socket which is, in turn, a function of the manufacturing tolerances of the parts. It will also be appreciated that, the deeper the socket receptacle 50, the smaller may be the angle of inclination of the retention ridges 31, 32 relative to the rotational axis X in order to ensure the proper amount of wedging of the fastener 50. In an embodiment, the retention ridges 31, 32 had an inclined angle from approximately 1.5 degrees to 7 degrees relative to the axis X (or axis Y of FIG. 5a) for engaging items having close tolerances, such as spark plugs, to other types of fasteners having wider tolerances, such as common bolts or nuts. It will be appreciated that other inclination angles may be used, depending upon the dimensional relationships of the parts. (Axis Y was included in FIG. 5a in order to more clearly show the inclined angle of ridge 32a). Preferably, the retention ridges 31, 32, 32a will be configured so that they engage the associated fastener 50 well above the closed end 22 of the receptacle 20. This permits a certain amount of wear of the retention ridges 31, 32, 32a while still ensuring good retention engagement with the associated fastener 50. It also permits the socket 10 to be fabricated such that the size of the socket 10 is at the upper end of the permitted ANSI range, thereby making it easier to insert the fastener 50 in the receptacle 20.

Thus, it may be understood that, because the first end 81 of retention ridge 31 is located farther from the crest 65 than the second end 82, the first end 81 is formed in the inclined surface 77 closer to the plane 75 than the crest 65 and also lower than the second end 82. Therefore, by machining the depression 35 having a paraboloid shape, the ridges 31, 32 provide a taper so that the first end 81 is spaced farther from the axis X and axis Y than the second end 82 (as shown in FIG. 5a). Thus, the machining process in order to form the depression 35 may be quickly and easily accomplished for each of the interior faces 25 in order to quickly provide for a socket 10 having retention ridges 31, 32. In an alternate embodiment a depression 35 having other shapes, such as a triangular outline may be provided and also form tapered retention ridges 31, 32.

It may be understood that the retention ridges 31, 32 having the tapered angle, eliminate axial tipping of a fastener 50 received within the receptacle 20. In an embodiment, the retention ridges 31, 32 may be incorporated into a Flank Drive®. In an embodiment, such a socket may be mass produced with minimal punch replacement. It is to be understood that such a socket 10 may be used on many types of fasteners, including spark plugs, nuts, bolts and the like. In an embodiment, each retention ridge 31, 32 may have a variety of shapes. The ridge may have a peak that is blunt, knife-edged, round, flat, concave, convex, toothed, etc. so that each edge may provide predetermined amounts of friction against a side 55 of a fastener 50 received within the receptacle 20.

From the foregoing, it can be seen that there has been provided an improved tool that can be used to retain and carry a fastener within the receptacle while the tool is being moved from a work area after removing the fastener from a hole or in order to locate the tool over the work area in order to insert the tool in the hole. The improved tool is also effective for turning threaded fasteners, because the socket is firmly and positively engageable with the fastener with the exertion of only moderate force and providing non-slip application of increasing rotational force to the fastener without substantially damaging the fastener. Alternate embodiments may be provided, for example, where the retention ridges are provided on the outside drive regions of a male drive body to engage a female receptacle.

While the tool of the present application has been disclosed in FIGS. 1-7 as embodied in a socket 10, it will be appreciated that the principles are applicable to any rotatably drivable member. In an alternate embodiment, for example, a fastener having a threaded shank and an enlarged socket head having a socket recess therein may be formed in accordance with the principles of the present application. A fastener may be adapted to be driven by an associated drive member, such as a hexagonal wrench, commonly known as a hex key, or the like. As well the principles of the device of the present application are applicable to any socketed device which is adapted to receive an associated male member in engagement in the socket.

While particular embodiments of the present application have been shown and described, it will be apparent to those skilled in the art that changes and modifications may be made without departing from the principles of the present application in its broader aspects. Therefore, the aim in the appended claims is to cover all such changes and modifications as fall within the true spirit and scope of the present application. The matter set forth in the foregoing description and accompanying drawings is offered by way of illustration only and not as a limitation. The actual scope of the present application is intended to be defined in the following claims when viewed in their proper perspective based on the prior art.

What is claimed is:

1. A retention socket for torquing and retaining a fastener, the socket comprising:
   a body having a plurality of interior faces disposed about a receptacle for receiving a fastener having a plurality of sides, said body having an open end and a closed end and said receptacle having an axis of rotation,
   at least one interior face having at least two retention ridges separated by a surface forming a concave depression so that at least one of the sides of the fastener, when received in the receptacle, is engageable by both retention ridges and not by the surface,
   wherein the interior face is generally convex as viewed from an axis of rotation of the receptacle, except for the concave depression formed in the interior face, and each of said retention ridges, being formed as an arcuate linear edge, converges to form an apex proximate the closed end and each retention ridge slopes towards the axis of rotation as they converge.

2. The socket of claim 1 wherein the concave depression is a paraboloid-shaped area.

3. The socket of claim 1, wherein the depression separating the retention ridges is wider adjacent to the open end than adjacent to the closed end.

4. The socket of claim 3 wherein the retention ridges meet at an apex adjacent the closed end.

5. The socket of claim 1 wherein the number of the interior faces is greater than two and the faces cooperate to define a closed configuration.

6. The socket of claim 1 wherein each of the interior faces alternate with intermediate areas to circumscribe the receptacle.

7. The socket of claim 1 wherein the interior faces are six in number and cooperate to form a generally hexagonal configuration.

8. The socket of claim 1 wherein the receptacle further includes an inner end surface substantially perpendicular to an axis of rotation and intersecting each of the interior faces at its inner end, the inner end surface having an opening therein centrally thereof.

9. The socket of claim 8 wherein the retention ridges are sloped at an inclined angle of approximately 1.5 to 7 degrees with respect to the axis.

10. The socket of claim 8 wherein the interior faces include opposed faces on opposite sides of the receptacle for respectively engaging opposite sides of the fastener received within the receptacle.

11. A tool comprising:
- a socket having a fastener-receiving receptacle with an axis of rotation, the receptacle having an open end and a closed end
- an interior surface formed within the receptacle, the interior surface defining a concave depression;
- a first retention ridge and a second retention ridge formed on the interior surface adjacent to the depression, the first and a second retention ridges each having a first end adjacent the open end and a second end adjacent the closed end and each being formed as an arcuate linear edge which converge at their second ends to form an apex proximate the closed end;
- wherein the interior face is generally convex as viewed from an axis of rotation of the receptacle, except for the concave depression formed in the interior face and the first ends of the retention ridges are spaced radially further from the axis than the second ends of the retention ridges, so that the fastener received in the receptacle is engageable by the first and second retention ridges and not by the concave depression.

12. The tool of claim 11 wherein the interior surface has a generally rectangular outline so that a center plane subdivides the rectangle in half and the second end of the first and second retention ridges is disposed approximately at the center plane.

13. The tool of claim 12 wherein the concave depression includes a generally paraboloid shape having a central axis and the concave depression is formed in the interior surface so that the central axis lies in the center plane.

14. The tool of claim 11 wherein each of the first and second retention ridges is generally concave as viewed from the center plane.

15. The tool of claim 11 wherein the second retention ridge is formed in the interior surface as a mirror image of the first retention ridge, the second retention ridge being separated from the first retention ridge by said concave depression, the first retention ridge second end overlying the second retention ridge second end to form an apex at the center plane and the first and second retention ridges form a generally paraboloid shape wherein the apex is spaced radially closer to the axis than the first ends of each of the ridges.

16. The tool of claim 11 wherein the concave depression is generally paraboloid in shape.

* * * * *

UNITED STATES PATENT AND TRADEMARK OFFICE
CERTIFICATE OF CORRECTION

PATENT NO. : 7,311,022 B2 Page 1 of 1
APPLICATION NO. : 10/919050
DATED : December 25, 2007
INVENTOR(S) : Gordon A. Putney, Marco E. DeVecchis and Scott G. Dahlke

It is certified that error appears in the above-identified patent and that said Letters Patent is hereby corrected as shown below:

Column 4 line 60 "convex" should be "concave".

Signed and Sealed this

Tenth Day of February, 2009

JOHN DOLL
*Acting Director of the United States Patent and Trademark Office*